Dec. 25, 1951    O. W. GREENE    2,579,567
MEANS FOR CONTROLLING THE FLOW OF
A FLUID HEAT TRANSFER MEDIUM
Filed Nov. 30, 1946    2 SHEETS—SHEET 1
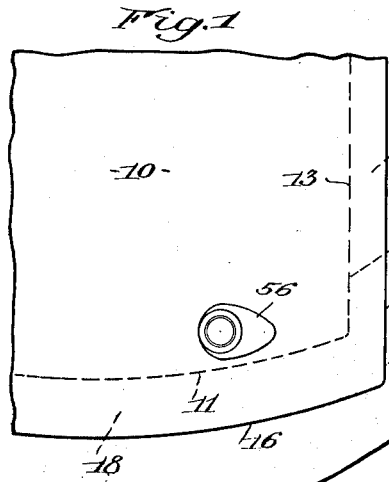
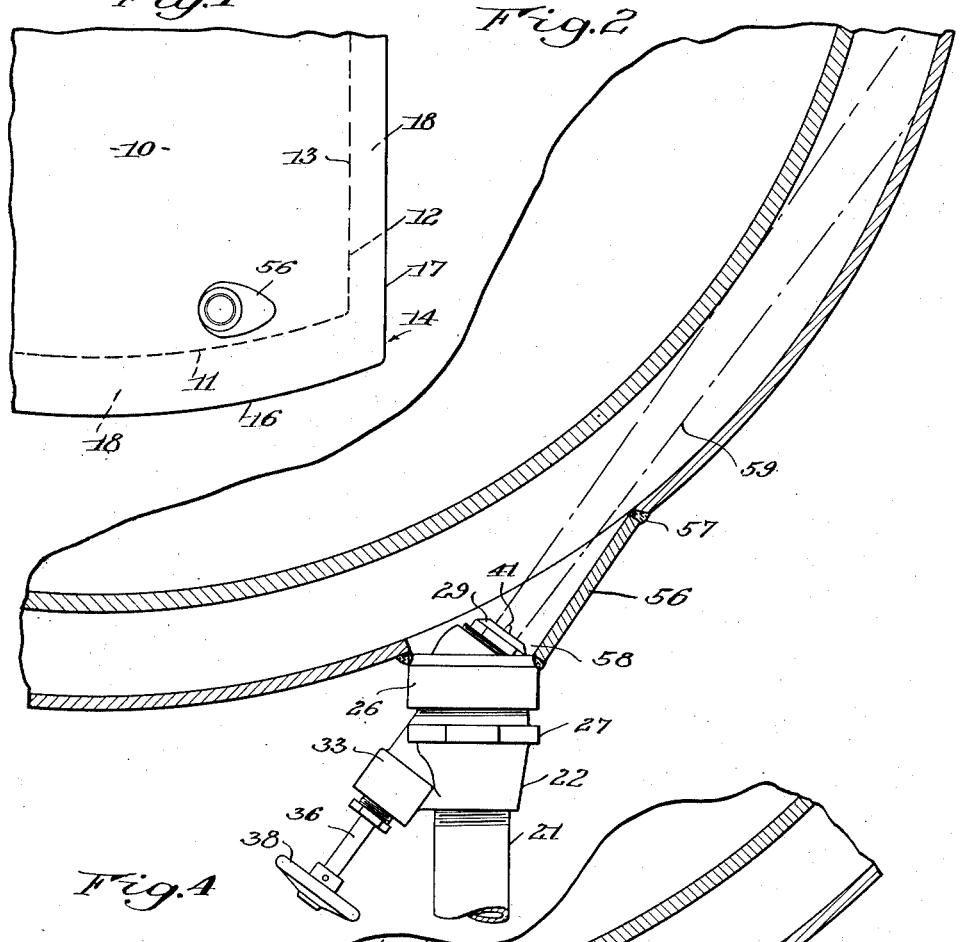
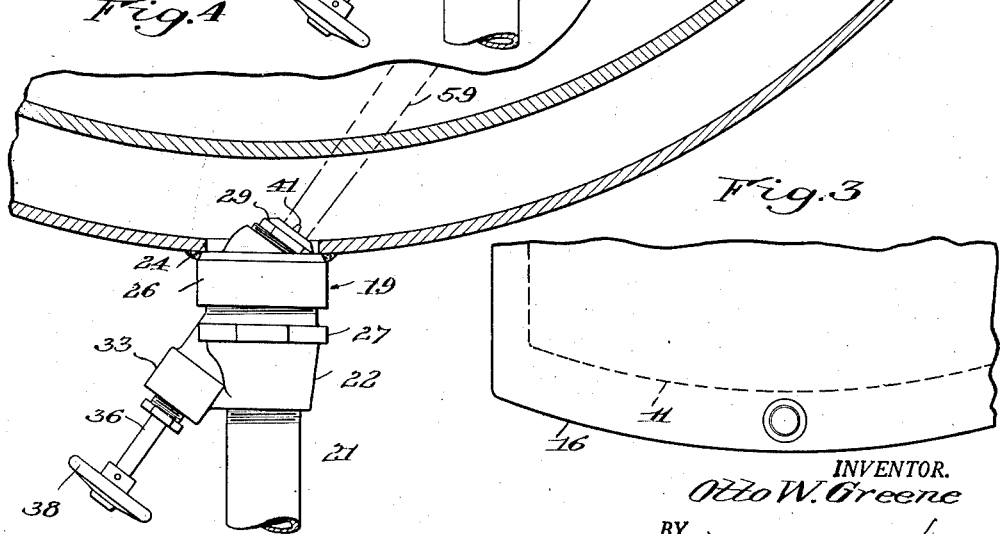
INVENTOR.
Otto W. Greene
BY
his Attorney Dec. 25, 1951 — O. W. GREENE — 2,579,567
MEANS FOR CONTROLLING THE FLOW OF
A FLUID HEAT TRANSFER MEDIUM
Filed Nov. 30, 1946 — 2 SHEETS—SHEET 2
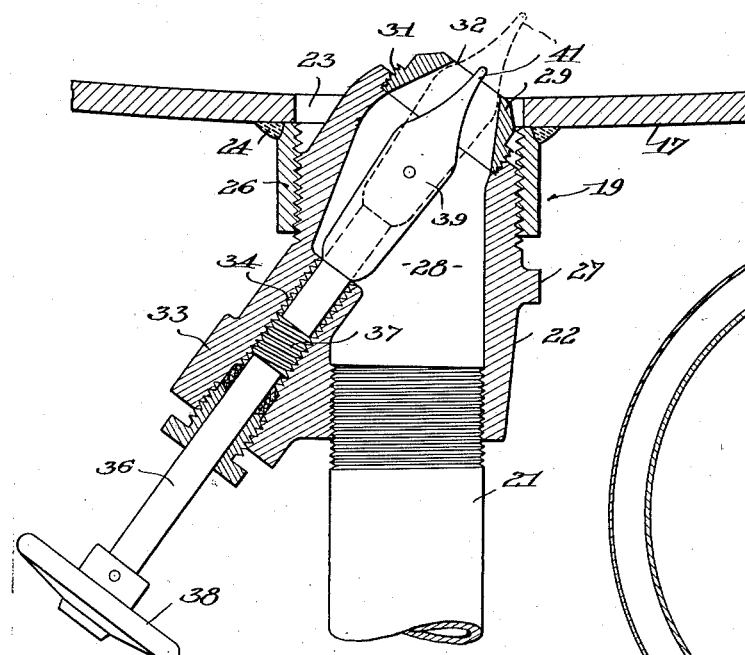
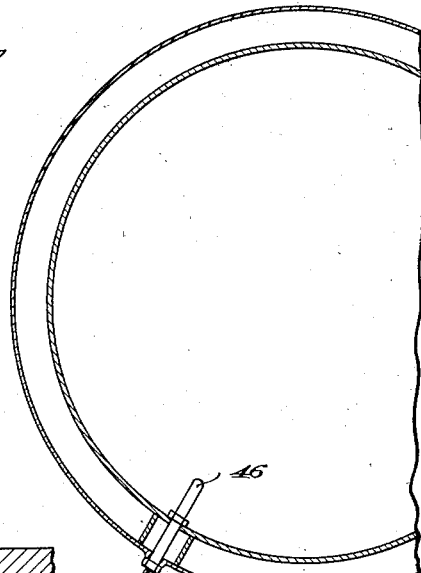
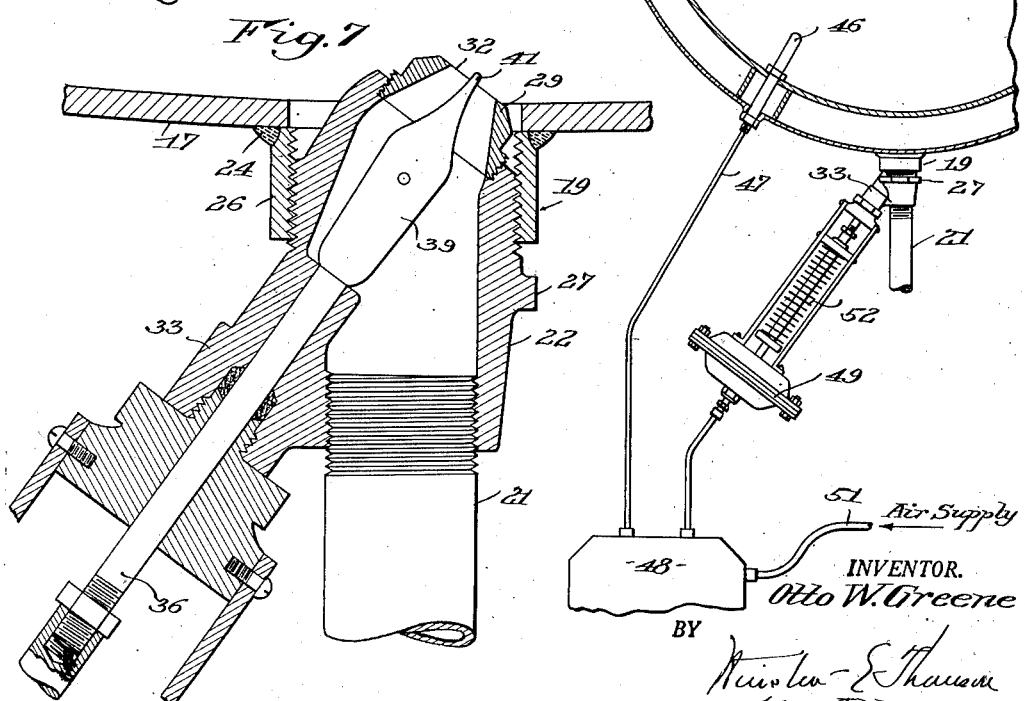
INVENTOR.
Otto W. Greene
BY
his Attorney Patented Dec. 25, 1951

2,579,567

UNITED STATES PATENT OFFICE 2,579,567

MEANS FOR CONTROLLING THE FLOW OF A FLUID HEAT TRANSFER MEDIUM

Otto W. Greene, Rochester, N. Y., assignor to The Pfaudler Company, Rochester, N. Y., a corporation of New York Application November 30, 1946, Serial No. 713,318

3 Claims. (Cl. 257—2)

My invention relates to a method and means for controlling the flow of a fluid heat transfer medium, particularly as applied to the control of the flow of a cooling or heating medium in a jacketed vessel such as a process vat or reactor kettle.

In the process industries, such as the food, dairy, beverage and chemical industries, the processes or reactions which are usually carried out in a jacketed processing vat or reactor frequently required accurate control of temperature. While the methods and means for controlling the flow of a fluid heat transfer medium in a jacketed vessel will be described in connection with the control of the flow of a cooling medium such as water, it will be appreciated that the method and means of my invention is equally applicable to the control of the flow of a heating medium, such as steam.

When considering the circulation of cooling water through a jacketed processing vat or reactor, it is important to bear in mind that the pressure and temperature of the cooling water available at any particular plant varies from plant to plant. Moreover, cooling water under the pressure and temperature conditions required is expensive and is an important factor of costs in any process plant. These factors of accurate control of the temperature of the material being processed; the variable conditions as to temperature and pressure of the cooling water available; and the relatively high cost of cooling water, make accurate control of the flow of the cooling water and most efficient use thereof highly desirable ends to be achieved.

When cooling a material contained in a processing vessel by means of a liquid circulating in the jacket thereof, the rate of heat transfer through the vat walls varies approximately as the eight-tenths power of the velocity of the water flow over the heat transfer surface. For this reason, to attain rapid cooling of the material being processed, rapid circulation of the cooling liquid must be induced in the jacket space. Moreover, this high liquid velocity must be available over as large a portion of the vat wall as possible.

The most common method of increasing the velocity of the water in the jacket space and distribution of the cooling water over the vat wall is to insert spiral coils or spiral baffles in the jacket space. These spiral coils increase the length of the path of the water as it flows over the heat transfer surface and hence the distribution and velocity of the liquid. However, both helical coils and helical baffles are expensive to install and have distinct disadvantages. The helical coil makes poor thermal contact with the vat walls while the baffles, to be effective, must be closely spaced to give the usual desired liquid velocity of three to six feet per second over the heat transfer surface. Moreover, the coils or baffles must fit both the outer wall of the processing vat and the inner wall of the jacket very closely to minimize short circuiting of the cooling medium. To secure this accurate fitting of the coils or baffles to the vat is expensive.

An object of my invention is to provide a more efficient method and means for circulating a heat transfer medium through the cooling jacket of a processing vat or reaction kettle.

Another object of my invention is to provide a method and means for circulating a fluid heat transfer medium through the jacket space of a process vat which is inexpensive to manufacture, more efficient in operation and utilizes the available pressure to produce a higher average rate of fluid flow over the heat transfer walls.

A further object of my invention is to provide an adjustable, highly efficient combined nozzle and valve which may be used in an open, unbaffled jacket space in such manner that it will circulate the fluid heat transfer medium either at an angle across the bottom of the vat or, in certain shapes of process vats, tangentially into the vertical portion of the jacket space to the end that the pressure energy available at the nozzle is efficiently converted into kinetic energy so as to produce rapid circulation of the fluid in the jacket space; relatively rapid flow of the fluid over the heat transfer walls; and efficient utilization of the heat transfer medium with relation to the desired temperature at which the contents of the vat are to be controlled.

My invention further contemplates a method and means for controlling the circulation of a heat transfer medium thru the jacket space of a process vat wherein a highly efficient adjustable nozzle is employed which maintains its efficiency in converting pressure energy into kinetic energy over a wide volume range of fluid flows, the nozzle being also used as a volume control valve regulated automatically in accordance with the desired temperature of the material being processed in the vat to be maintained, to the end that this temperature may be accurately controlled while at the same time maintaining efficient utilization of the heat transfer medium at the pressure and temperature thereof available.

Other objects and advantages of my invention will be set forth more particularly in the claims and will be apparent from the following description, when taken in connection with the accompanying drawings, in which:

Fig. 1 is an external view of a portion of a processing vat or reaction kettle illustrating how the combined nozzle and valve of my invention is applied when it is to be utilized in connection with a processing vat which is rather small in diameter but relatively high;

Fig. 2 is a horizontal sectional view showing the combined nozzle and valve, the manner in which it is set in the side-wall of the vat, and illustrating how the stream is directed tangentially into the jacket space;

Fig. 3 is a view showing the combined nozzle and valve of my invention employed in connection with a processing vat of relatively large diameter;

Fig. 4 is a view of the combined nozzle and valve showing a horizontal cross-section of the vat of Fig. 3 and illustrating how the stream of heat transfer medium is directed across the bottom of the vat;

Fig. 5 is a sectional view showing the details of the combined nozzle and valve illustrated in Figs. 2 and 4;

Fig. 6 is a diagrammatic view showing how the combined nozzle and valve may be controlled automatically to vary the flow of the heat transfer medium in accordance with the desired temperature at which the material in the vat is to be maintained; and Fig. 7 is a sectional view showing the details of the combined nozzle and valve of Fig. 6.

The method and means of my invention may be employed in connection with any type of process vat or reaction kettle employing a jacket space for circulation of the heat transfer medium. While the invention will be described in connection with the circulation of a cooling liquid through the jacket space, it will be understood that the invention has general application and may be employed either for circulation of a cooling or heating medium through the jacket space.

A typical process vat 10 with which my invention may be employed is shown in Fig. 1. The vat includes a bottom wall 11, a side or heat transfer wall 12, preferably cylindrical in shape, and a top wall (not shown). The inner wall 13 of the process vat is preferably glass lined but, for some applications, stainless steel or other alloys may be employed in accordance with the corrosive characteristics of the materials being processed. Around the vat 10 a shell 14 is provided which includes a bottom wall 16, side walls 17, substantially cylindrical in shape, and a top wall (not shown). The shell 17 is spaced from the process vat 10 so as to provide a jacket space 18 which completely surrounds the process vat.

As previously mentioned, it is common practice to provide a helical coil or helical baffle in the jacket space 18 between the walls to direct the heat transfer medium in a helical, circulatory path around and over the heat transfer surface 12. In addition to the expense of installation, I have found these spiral coils not only cause an undue drop in the pressure available for circulation of the liquid but also the flow velocity of the heat transfer medium is decreased due to the increased resistance to flow caused by the surface area of the helical coil. I have also found that there is a considerable difference in temperature between the temperature of the cooling medium at the bottom of the vat and that at the top of the vat. This results from the relatively long helical path through which the liquid travels and the lack of direct communication between the cooling medium at the top of the vat and that at the lower portion of the vat, except through the helical path. For this reason it has been my experience that accurate control of the temperature of the contents of the process vat is difficult because of the wide variation in the temperature of the heat transfer medium at the bottom of the vat from that at the top.

In the method and means of my invention, the jacket space is left open and clear of obstructions to provide a free circulation space for the heat transfer medium. As shown in Fig. 5, the heat transfer medium is directed into the jacket space by means of a nozzle, generally indicated by the numeral 19. In Figs. 1 and 2 I have shown the combined nozzle and valve applied to a process vat which is relatively small in diameter and of considerable height. In Figs. 3 and 4 the combined nozzle and valve of my invention has been applied to a process vat, the diameter of which is relatively large so that the heat transfer surface presented by the bottom of the vat is a relatively large proportion of the whole. The angle at which the combined nozzle and valve of Fig. 5 is set is for application to the vat of Figs. 3 and 4.

As shown in Fig. 3 the nozzle is set at the bottom of the outer shell in such position that it lies below the bottom wall of the process vat. The heat transfer medium such as cooling water enters the nozzle through a pipe 21 (Fig. 5) which is threaded into a combined jet and valve body 22.

The shell 17 is provided with an opening 23 to the outer margins of which is welded as shown at 24, a threaded fitting 26. The combined jet and valve body is threaded into this fitting, as shown in Fig. 5.

The combined jet and valve body includes a main casting part 27 which has a thru-passage 28 and a nozzle 29 threaded angularly into the main casting, as shown at 31. The nozzle 29 has substantially frustro-conical inner sidewalls which terminate in a nozzle opening 32. The nozzle opening is of predetermined size, predetermined in accordance with the requirements of the particular installation. While, if desired, the nozzle may be integral with the main casting 27, I have shown these as separate parts to enable the application of different sizes of nozzles to the main casting 27.

The main casting part has an off-set 33 which has a threaded bore 34. A valve stem 36 has a threaded part 37 for cooperation with the threads of the bore. The outer end of the valve stem carries a hand piece 38 by which the stem may be threaded into and out of the bore. The inner end of the stem carries a valve part 39, the outer end of which is tapered substantially to a point, as indicated at 41. By means of the hand piece, the valve part 39 may be threaded into and out of the bore so as to move the position of the valve part 39 with respect to the nozzle 29, the limits of position being approximately those illustrated in Fig. 5 by dotted and solid lines.

In the solid line position shown in Fig. 5, the combined jet and valve has approximately its maximum open position. In this position a maximum flow of liquid through the nozzle is possible. Any intermediate position between the solid line position and the dotted line position is possible so as to restrict the area of the flow of the heat transfer medium to the jacket space.

While nozzles of the general type shown are well known in the art of nozzles, insofar as I am aware, no one has appreciated the value of a combined adjustable jet and valve in the circulation of a heat transfer medium through the jacket space of a process vat. One of these advantages lies in the fact that the entire pressure drop occurs at the nozzle and this pressure drop remains approximately the same regardless of the position of the valve 39 with respect to the nozzle 29. The valve merely decreases the size of the stream. That is, with a given pressure of the heat transfer medium flowing to the nozzle, the pressure drop through the nozzle will be substantially the same in the fully open position shown in Fig. 5 as it is when the valve is moved to such a position as to restrict the flow of heat transfer medium to let us say approximately 25% of that of the fully open position. With the pressure drop remaining approximately constant throughout the desired range of use of the nozzle, the kinetic energy imported to the liquid in passing through the nozzle remains approximately constant throughout its range of use.

Moreover, the efficiency of the nozzle as an instrumentality for converting pressure energy into kinetic energy remains relatively constant throughout the range of desired positioning of the valve 39 with respect to the nozzle 29. This is particularly important in the process industries for the reason that the pressure and the temperature of the cooling water available varies widely from one plant to another. Thus, the adjustable nozzle enables most efficient use of the cooling liquid regardless of the temperature and pressure of the cooling liquid available in the particular plant in which the process vat is installed. It follows from the above that with a given volume of liquid supplied to the jacket space at a given pressure, the maximum flow velocity of cooling liquid over the heat transfer walls is obtained. This is important because, as previously mentioned, the effectiveness of heat transfer varies roughly as the eight-tenths power of the velocity of the liquid over the heat transfer surface.

Upon reference to Fig. 4, it will be observed that the angular relation of the valve 39 and the nozzle 29 with respect to the supply pipe 21 enables the application of the combined jet and valve body 22 along a radius of the shell. This simplifies the installation and provides a stream which sweeps across the bottom jacket space at an angle to a radius such that a circulatory motion of the liquid is obtained. This circulatory motion of the liquid across the bottom of the jacket space is effective to produce a circulatory motion around the vertical portions of the jacket space to the outlet opening for the cooling liquid (not shown). This circulation flow is effective, as shown by actual tests, all the way to the top of the vat because the lack of any obstructions in the jacket space enables the whole body of liquid in the jacket space to be set in circulating motion. Thus, a circulating flow of the cooling liquid over the heat transfer walls is obtained over the entire heat transfer service.

One of the particular advantages of the combined jet and valve of my invention is that it permits accurate temperature control of the material being processed. Accurate temperature control of the material being processed is becoming more and more critical in the process industries. While temperature control may be obtained by hand operation of the valve 39, it is more effectively and accurately obtained by automatic adjustment in the position of the valve 39 in accordance with and responsive to fluctuations in the temperature of the material being processed from the desired temperature.

For this purpose I have shown in Figs. 6 and 7 in diagrammatic form an automatic temperature controller applied to the valve 39. As is well known in the art, such automatic temperature controls include, in general, a thermostatic bulb 46 in contact with or exposed to the material being processed which is connected by a tube 47 to a controller 48. This thermostatic bulb contains an expansible gas which is effective to vary the position of a diphragm illustrated at 49. As is usual in such types of controller, the diaphragm is also supplied with air at constant pressure through a connection 51. The opposite side of the diaphragm 49 is subjected to the pressure of a spring 52 through which pressure is applied on the valve stem.

It will be appreciated that when an automatic temperature control is applied to the combined jet and valve of my invention, the valve stem 36 extends through an unthreaded bore in the offset portion 33 of the casting. As will be understood, fluctuations in the temperature of material being processed will vary the position of the valve 39 with respect to the nozzle 29 to vary the flow of cooling liquid through the jacket space so as to maintain a substantially constant temperature of the material being processed.

In Figs 1 and 2 I have shown the application of the combined adjustable jet nozzle and valve to the side wall of a process vat. This application of the nozzle unit is primarily intended for application to process vats of relatively small diameter and considerable height. In this arrangement an adapter 56 is welded to the shell wall, as shown at 57. The shape of the adapter is shown most clearly in Fig. 1. This adapter has an opening 58, the axis of which is at an angle to radius of the shell such that, when the combined jet and valve are applied to the adapter as by welding, the jet stream, as indicated at 59, is directed substantially tangentially into the jacket space. With this arrangement the stream, except tangentially, does not strike the side wall of the process vat which would cut down the velocity of the stream. Thus, the full energy of the liquid issuing from the nozzle is effective to produce circulation of the liquid; maximum flow velocity over the heat transfer walls; and most efficient use of the cooling liquid under the temperature and pressure conditions which exist. The arrangement shown also permits the application of the same jet nozzle and valve body 22 either to the type of vat shown in Figs. 3 and 4 or to the type of vat shown in Figs. 1 and 2.

While I have shown the preferred method and means of my invention and have illustrated specific applications of a combined nozzle and valve to a jacket space, it will be appreciated that various modifications and changes may be made, particularly in the form and relation of parts without departing from the spirit of my invention as set forth in the appended claims.

I claim:

1. In a process vat having a jacket space, in combination, an inlet pipe for the heat transfer medium connected to the jacket space, a combined nozzle and valve arranged at the entrance to the jacket space for varying the flow of heat transfer medium thereto and directing the stream of heat transfer medium at the desired angle into said jacket space, and means responsive to the temperature of the contents of the vat for automatically varying the position of said valve with respect to said nozzle to control the flow of the heat transfer medium to said jacket space.

2. In a process vat having a jacket space, in combination, an inlet pipe for the heat transfer medium, a fitting to which said inlet pipe is connected, said fitting having a through opening terminating in a nozzle and a valve movable in said fitting to vary the effective opening through said nozzle, said nozzle and valve extending at an angle such that the stream of liquid is directed into said jacket space substantially tangent to the heat transfer wall of the vat, and means responsive to the temperature of the contents of the vat for automatically varying the position of said valve with respect to said nozzle to control the flow of the heat transfer medium to said jacket space.

3. In a process vat having a jacket space, in combination, an inlet pipe for the heat transfer medium connected to the jacket space, a combined nozzle and valve arranged at the entrance to the jacket space for varying the flow of heat transfer medium thereto and directing the stream of heat transfer medium at the desired angle into said jacket space, a thermostatic element in contact with the contents of the vat, and means responsive to said thermostatic element for automatically varying the position of said valve with respect to said nozzle to control the flow of the heat transfer medium to said jacket space.

OTTO W. GREENE.

REFERENCES CITED

The following references are of record in the file of this patent:

UNITED STATES PATENTS

| Number | Name | Date |
| --- | --- | --- |
| 653,120 | Reid | July 3, 1900 |
| 766,442 | Gruener | Aug. 2, 1904 |
| 1,382,735 | McAulay et al. | June 28, 1921 |
| 1,929,706 | Mojonnier | Oct. 10, 1933 |
| 2,002,242 | Greene | May 12, 1935 |
| 2,109,694 | Goble | Mar. 1, 1938 |
| 2,317,480 | Peters | Apr. 27, 1943 |